United States Patent [19]
Bobard

[11] 3,820,615
[45] June 28, 1974

[54] SELF-PROPELLED VEHICLE WITH WHEEL-GAUGE ADJUSTABLE DURING OPERATION

[75] Inventor: Emile Bobard, Beaune, France
[73] Assignee: Bobard Jeune, Beaune, France
[22] Filed: May 2, 1973
[21] Appl. No.: 356,482

[30] Foreign Application Priority Data
May 4, 1972  France .......................... 72.16298

[52] U.S. Cl. .................................................. 180/1 F
[51] Int. Cl. ............................................. B60k 33/00
[58] Field of Search ........... 180/1 F, DIG. 2, 26 R, 180/44 R, 1 R

[56] References Cited
UNITED STATES PATENTS
2,228,454   1/1941   Hamilton ............................ 180/1 F Primary Examiner—Stanley H. Tollberg

[57] ABSTRACT

The vehicle described comprises: two side chassis structures respectively provided with driving and steering wheels and spaced-apart from each other by transverse members; driving and transmission means; means for varying the distance between to the two structures, actuated by driving means including at least one jack; operating means acting from a driving station for steering wheels including at least one composite coupling rod constituted by two transverse rods; and means for synchronizing the variations in distance apart of the structures and of the length of the coupling rod. One of the rods is provided in the form of a toothed rack in engagement with a toothed pinion and the synchronizing means comprise a further transverse toothed rack, similar to the said coupling rack and in engagement with another pinion similar to the said coupling pinion, and a longitudinal shaft of variable length provided at its two extremities with universal joints coupling the pinions together for rotation. The relative arrangements of the pinions on their respective toothed racks is adapted to the realtive positions of the chassis portions with which the racks and pinions are associated.

4 Claims, 3 Drawing Figures

PATENTED JUN 28 1974 3,820,615

SELF-PROPELLED VEHICLE WITH WHEEL-GAUGE ADJUSTABLE DURING OPERATION

The present invention relates to a self-propelled vehicle with an adjustable wheel-gauge; it is more particularly directed to a simple mechanism ensuring excellent synchronism of the variations in distance apart of the transverse elements of such a vehicle, especially of the coupling bar or bars of its steering control rod system.

Self-propelled vehicles are known, especially tractors, comprising a straddle chassis appropriate for the adjustment of its wheel gauge (see French Pat. No. 1,539,177 with no foreign Patent) so as to be adapted to work in plantations, the widths of which are different from each other, or for carrying successively between their sides underneath their chassis loads or machines (see Canadian Pat. No. 815,346 of the 13th May 1966.

A chassis of this type essentially comprises transverse members located above a straddle level and on which are arranged to slide by means of jacks (for example screw and nut jacks) members rigidly fixed to sides supported by driving and steering wheels.

However, the adjustment of the distance apart of the sides during the course of operation of the tractor, necessarily in a straight line, are not fully automatic, and the vehicle described in U.S. Pat. No. 1,539,177 necessitates manual action in order to adapt the length of the coupling rod of its steering rod system to the adjustment of the distance apart of the sides, which adjustment may be effected from a power takeoff of the engine of such a vehicle by suitable control of the above-mentioned jacks.

It is true that the U.S. Pat. No. 2,173,419 of 8/2/1938 to JOHNSON proposes a device applicable to an automobile vehicle in order to ensure automatically during the course of manoeuvres, a simultaneous adjustment of the track of the steering-wheels and of the length of the coupling rod joining the pivotal shafts of these wheels.

However, this JOHNSON device is not applicable to a driving axle of a conventional vehicle, consisting of two parts associated with a differential rear axle, and the technique described in this patent does not suggest any means of ensuring the synchronism of the variations, without jamming, of the front and rear wheel tracks which is necessary for example in the case of a straddle chassis, each side of which must necessarily be caused to circulate in an interline of plantation which may be narrow.

The present invention proposes to remedy these disadvantages.

It has the essential purpose of proposing a simple mechanism ensuring good synchronism of the adjustments of the lengths of transverse members, in particular a coupling rod for the steering wheels of a chassis of a self-propelled vehicle with variable front and rear wheel tracks.

A vehicle of this kind mainly comprises:

Two lateral chassis structures such as sides, respectively provided with driving wheels and steering wheels, assembled on opposite parts of transverse members on which at least one of these structures is slidably mounted;

driving and power transmission means for the driving wheels, carried by parts of the chassis thus formed;

means for varying the distance formed between the two chassis structures, especially at least one jack capable of being actuated by the said driving means;

means for operating steering wheels from a driving station and comprising at least one composite coupling rod of adjustable length, constituted by two transverse rods capable of being displaced with respect to each other, and means for synchronizing the variations in distance apart of the chassis structures and of the length of the said coupling rod.

A self-propelled vehicle of this kind is remarkable in that one of the rods of the composite coupling rod takes the form of a toothed rack in engagement with a toothed pinion, and that the synchronizing means comprise another transverse toothed rack similar to the said coupling rack and in engagement with another pinion similar to the said coupling pinion, and a "longitudinal" shaft of variable length provided at its two extremities with universal joints associating these two pinions together in rotation; the relative arrangements of the said pinions on their toothed rack being adapted to the relative positions of the chassis parts with which these racks and pinions are associated.

In a first alternative form, the vehicle chassis simply comprises two lateral structures assembled to each other by conventional cross-members of variable length. In such a case, the two racks may be respectively associated with one of the two lateral structures and the shafts of the pinions are associated with the other structure, these two pinions being both arranged either above or below their respective racks.

In another alternative form of a vehicle according to the invention, the two lateral chassis structures may slide on the opposite extremities of the cross-member, of which the central part is fixed to the platform intended to be kept more or less spaced apart from these two lateral structures, in dependence on the distance apart formed between these latter. In such an alternative form, the composite coupling rod is constituted by two toothed racks disposed head-to-tail and in engagement with a single pinion, and the synchronizing means comprise at least two other racks and a pinion forming a mechanism similar to that of the composite coupling rod, the said pinions being associated with each other by a longitudinal shaft of variable length, provided at its extremities with universal joints permitting the transverse oscillations of the coupling rod during the course of pivotal movements of the steering wheels.

The invention will be more readily understood by reference to the accompanying drawings which represent, solely by way of example, one preferred form of embodiment.

Figure 1:
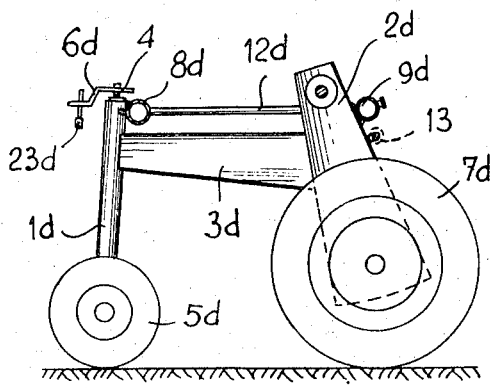
FIG. 1 represents, to a small scale in lateral section, a straddle tractor equipped with a device according to the invention.
Figure 3:
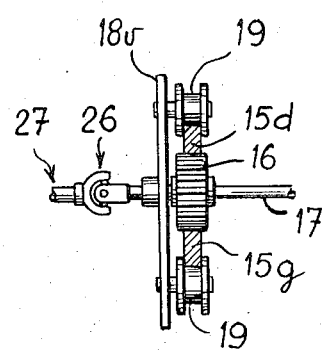
FIG. 3 shows in cross-section a detail of a device according to the invention.
Figure 2:
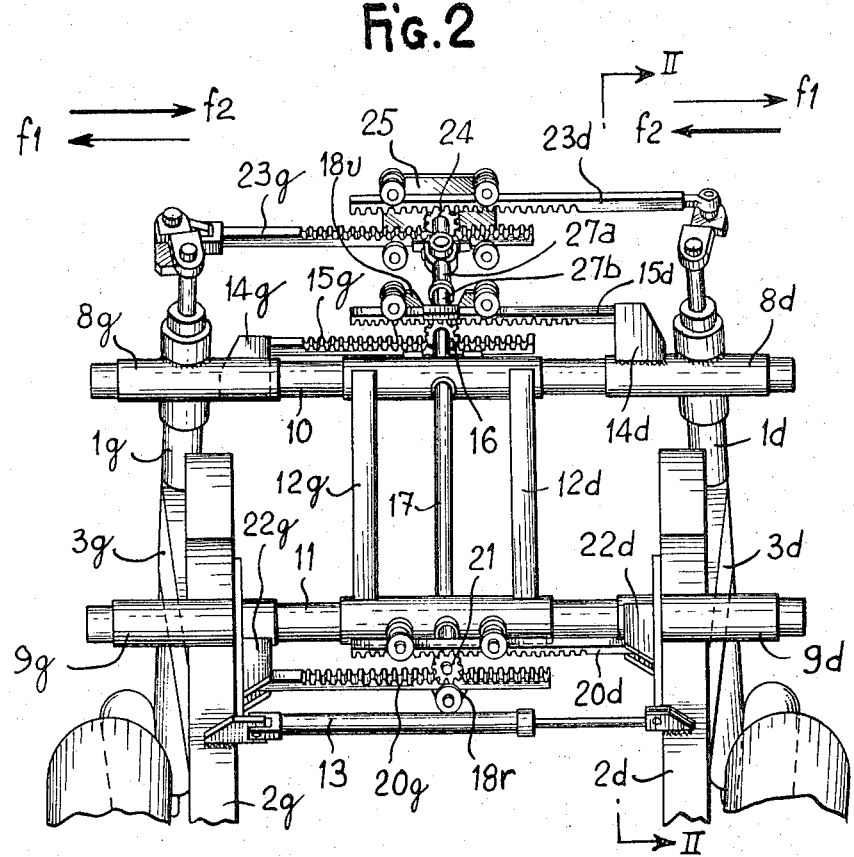
FIG. 2 shows a perspective view of the tractor of FIG. 1 looking on the rear and with parts broken away.

In FIGS. 1 and 2, there can be seen two tubular elements 1d and 2d arranged approximately in the same vertical plane, spaced apart from each other and rigidly fixed to the respective extremities of a third sectional element 3d forming a longitudinal girder.

The element 1d is equipped with pivotal bearings for a rod 4 and a wheel 5d is fixed pivotally on the lower extremity of this rod 4 by means of a conventional stub-axle not shown in the drawing; a crank-arm 6d is fixed on the upper extremity of this rod 4.

The driving shaft of a wheel 7d is mounted transversely on the lower portion of the element 2d, and it should be noted that this latter takes the form of a box or protective casing inside which are mounted, in known manner, transmission means such as chains and toothed wheels to ensure the drive of the wheel 7d.

Finally, two tubular rigid elements 8d, 9d, similar to each other and relatively short, are respectively welded on the upper portion of the element 1d constituting a leg of a steering wheel 5d, and on the top portion of the element 2d constituting a leg of the driving wheel 7d, these two elements 8d, 9d being arranged parallel to each other and perpendicularly to the vertical plane of rolling of the wheel 7d.

Elements 1g to 9g, respectively similar to the elements 1d to 9d described above, are similarly symmetrically assembled with respect to a vertical plane P, parallel to the rolling plane of their wheels 7d, 7g.

In addition, two rigid tubular rods 10, 11, the end portions of which are arranged so as to slide, practically without play inside the "sleeves" formed by the elements 8d to 9g are arranged parallel to each other and perpendicularly to the above-mentioned plane P, and are engaged in these sleeves 8d to 9g. The central portions of these two rods 10, 11 forming cross-members are assembled to the respective extremities of the longitudinal elements 12d, 12g so as to constitute a platform frame.

It will be understood that the assemblies described above form a chassis with longitudinal sides spaced apart by a straddling platform 12d, 12g which may carry a motor-gear-box-differential back-axle and a driving station (not shown) so as to constitute a conventional straddle tractor. The transverse shafts of the differential back axle being respectively associated for sliding movement with the transmission means of the elements 2d, 2g and the crank-arms 5d, 6g being associated with each other by a conventional link-rod steering system suitably connected in known manner to the driving station, and comprising a composite coupling rod which will be described in detail below.

Finally, a double-acting hydraulic jack 13 is arranged slightly below the cross-member 11 and parallel to this latter, the bottom of the cylinder and the piston rod of this jack 13 being respectively fixed in the usual manner to lugs welded at a single level on the high portion of the legs of the wheels 2g, 2d, so that this jack is located almost vertically in line with the point of contact on the ground of the driving wheels 7d, 7g.

In addition, this jack 13 is connected by pipes to a source of fluid under pressure (not shown) provided on the platform 12d, 12g and is connected to a power take-off of the engine unit. These pipes form a circuit which is provided with a cock device capable of being controlled from the driving station.

Furthermore, a lug 14g is welded on the front portion, internal with respect to the chassis, of the sleeve 8g and slightly below the geometric axis of this latter. A rectilinear rod 15g of rectangular section is fixed at one of its extremities to this lug 14g, while being extended towards the central portion of this chassis and parallel to the crossmember 10. Teeth are formed on the upper face of this rod 15g so as to form a conventional toothed rack.

Another toothed rack 15d, identical with the rack 15g, is arranged parallel to and above this latter by means of a similar fixing of one of its extremities to another lug 14d fixed to a front portion of the sleeve 8d which is located slightly above the geometric axis of this latter.

A "pinion" 16 comprising teeth appropriate to those of the toothed racks 15d and 15g and having a diameter suited to the distance formed between these racks, thus arranged head-to-tail, one with respect to the other, and in engagement with these racks. This pinion 16 is fixed on a shaft 17 located longitudinally in the central vertical plane of the chassis and mounted in bearings arranged on the cross-members 10 and 11, perpendicular to the geometric axes of these latter.

In addition, an element 18 cut-out from a plate is arranged close to the front faces of the racks 15d, 15g and is provided with a bearing in which the front portion of the shaft 17 is engaged.

Two rollers 19 comprising rectangular grooves having a profile corresponding to that of the back of the rack 15d are located above this latter and are in contact with the said back. These rollers are mounted freely on pivotal axes respectively fixed on the plate 18, on each side of the vertical plane of the shaft 17 and in contact with the back of the rack 15g.

A mechanism, identical with the mechanism constituted by the pinion 16, the rollers 19 fixed on the plate 18 and the two racks 15d, 15g, is arranged at the extremity of the shaft 17 which extends to the rear of the cross-member 11. This mechanism comprises two toothed racks 20d, 20g arranged head-to-tail in engagement with a pinion 21 engaged on guiding rollers 19 mounted on a plate 18r and respectively fixed by one extremity to lugs 22d, 22g respectively welded at appropriate levels on the sleeves 9d, 9g.

Finally, a third mechanism similar to these two mechanisms is arranged transversely between the crank-arms 6d, 6g so as to constitute a composite coupling rod for the pivots 4 of the steering wheels 5d, 5g. This mechanism comprises two toothed racks 23d, 23g and a pinion 24, the shaft of which is mounted in a bearing fixed on the central portion of a plate 25 provided with four guiding rollers 19 for these two racks.

The rear extremity of the shaft of the pinion 24 is coupled to one of the parts of a cardan joint 26v, the other portion of which is fixed to a splined sleeve 27a. A mandrel 27b having splines similar to those of the sleeve 27a is engaged in this latter so as to constitute a shaft 27 of adjustable length. This shaft 27 is coupled at the front extremity of the shaft 17 by another kinetic joint to the cardan 26r.

Finally, the outer extremities of the toothed rack 23d, 23g are respectively mounted, by virtue of conventional articulation means, on the end portions of the crank-arms 6d, 6g.

The foregoing description makes it possible to understand that the jack 13 may be actuated so as to move away (arrow f1) or bring closer (arrow f2) one of the two sides of the straddle chassis with respect to the other side, and taking account of the fact that the rear portion of the tractor carried by the driving wheels 7, relatively large, is substantially heavier than the front portion carried by the relatively-small steering-wheels 5, it can be seen that the arrangement of the jack 13 is well suited to an excellent sliding movement of the sleeves 9d, 9g on the cross-member 11.

In addition, such transverse sliding movements have the effect of driving the toothed racks 20d, 20g of the rear mechanism, which can only have actions on the pinion 21 which are strictly equal to each other, in order to ensure an exactly central position of the platforms 12d, 12g between the two sides.

Furthermore, the pinion 16 becomes driven in synchronism with the pinion 21 by means of the shaft 17, so as to actuate the racks 15d and the rack 15g of the first mechanism in an exactly similar manner and thus avoids jamming of the cross-member 10 in its sleeve 8d, 8g, the forces required by the first mechanism (pinion 16) from the second mechanism (pinion 21) being small by reason of the action of the jack 13 on the sides.

Finally, the toothed racks 23d, 23g of the coupling rod are driven in exactly the same manner by their pinion 24 by means of the shaft 27, irrespective of the inclination of this shaft, so as to ensure variations in length of this rod exactly equal to those of the two sides of the tractor. The force required for these variations is relatively small since it corresponds especially to the sliding and rolling friction of the elements of this mechanism.

In addition, it will be understood that in the case of a tractor which is relatively light or which comprises a short chassis, the jack 13 may be mounted transversely on the longitudinal members 3d, 3g between the legs 1d, 2d on the one hand and 1g and 2g on the other, and that in consequence, the mechanism with the pinion 16 may be eliminated.

Furthermore, in the case where it is not necessary to hold the chassis platform in a central position, the crossmembers 10 and 11 may be rigidly fixed to the sleeves 8g, 9g for example, while the toothed rack 20g (and possibly 15g) may be dispensed with and the rack 23g must be replaced by a usual rod which is rigidly fixed to the plate 25 in order that the pinion 24 may have its effect on the toothed rack 23d.

It will be observed that in this case, the racks 23d, 20d (and possibly 15d) are located on the same side (either above or below) of their pinions 24, 21 (and possibly 16), but a similar result would be obtained by reversing the toothed rack 20d (and possibly 15d) with respect to the rack 23d. In such a case, this toothed rack 20d (and 15d) would be replaced by the rack 20g (and 15g). However, the plate 18r carrying the shaft of the pinion 21 should be assembled on the longitudinal member 3d. The shaft 27 could then take-up oblique positions for a movement of the vehicle in a straight line and should permit relatively large elongation, which could be a disadvantage.

In all cases, the mechanism comprising the pinion 21 (and possibly 16) ensures an effective synchronism of the adjustments in length of the coupling rod, and it will be observed that this device is simpler and cheaper than the sliding mandrel device in a sleeve according to JOHNSON. These mandrels, equipped with pivots of steering wheels, are in fact arranged in the form of nuts co-operating with a single jack screw which necessitates, in order to be driven in rotation from one of the steering wheels, two gear trains in an oil bath and a shaft of variable length with kinetic joints for the transmissions of movements between these two gear trains. In addition, its coupling rod, in two parts forming a screw and nut, necessitates a third train of gears.

In addition, this JOHNSON device comprises a complex clutch mechanism in both directions from a steering wheel which is relatively lightly loaded, in order to supply the power necessary for these variations in wheel gauge.

I claim:

1. A self-propelled vehicle with adjustable wheelgauge comprising:

two side chassis structures respectively provided with driving and steering wheels and being spaced-apart from each other by means of transverse members;

means for driving and transmission to the driving wheels;

means for varying the distance between the two side structures, said varying means being actuated by driving means, including at least one jack;

operating means acting from a driving station for steering wheels, including at least one composite coupling rod constituted by two transverse rods;

means for synchronizing the variations in distance apart of said structures and of the length of said coupling rod; one of the rods of said composite coupling rod being provided in the form of a toothed rack in engagement with a toothed pinion; said synchronizing means comprising a further transverse toothed rack, similar to said coupling rack and in engagement with another pinion similar to said coupling pinion, and a longitudinal shaft of variable length, provided at its two extremities with universal joints coupling said two pinions together for rotation, the relative arrangements of said pinions on their respective toothed racks being adapted to the relative positions of chassis portions with which said racks and pinions are associated.

2. A self-propelled vehicle in accordance with claim 1, said means for varying the distance between the two structures of a chassis being located in a central lateral portion of said chassis, said vehicle further comprising two toothed racks associated with one of the two chassis structures, the two corresponding pinions being associated with the other chassis structure and having the same arrangement with respect to their toothed racks.

3. A self-propelled vehicle in accordance with claim 1, said chassis comprises two cross-members permitting the sliding movement of said chassis structures assembled to each other by a platform; said coupling rod comprises two toothed racks arranged head-to-tail with a single pinion; said synchronizing means comprising at least two further toothed racks and a pinion forming a mechanism similar to that of said composite coupling rod.

4. A self-propelled vehicle in accordance with claim 1, said means for varying the distance between the two structures comprise at least one hydraulic jack connected to a source of fluid under pressure on the vehicle.

* * * * *